Patented Oct. 8, 1946

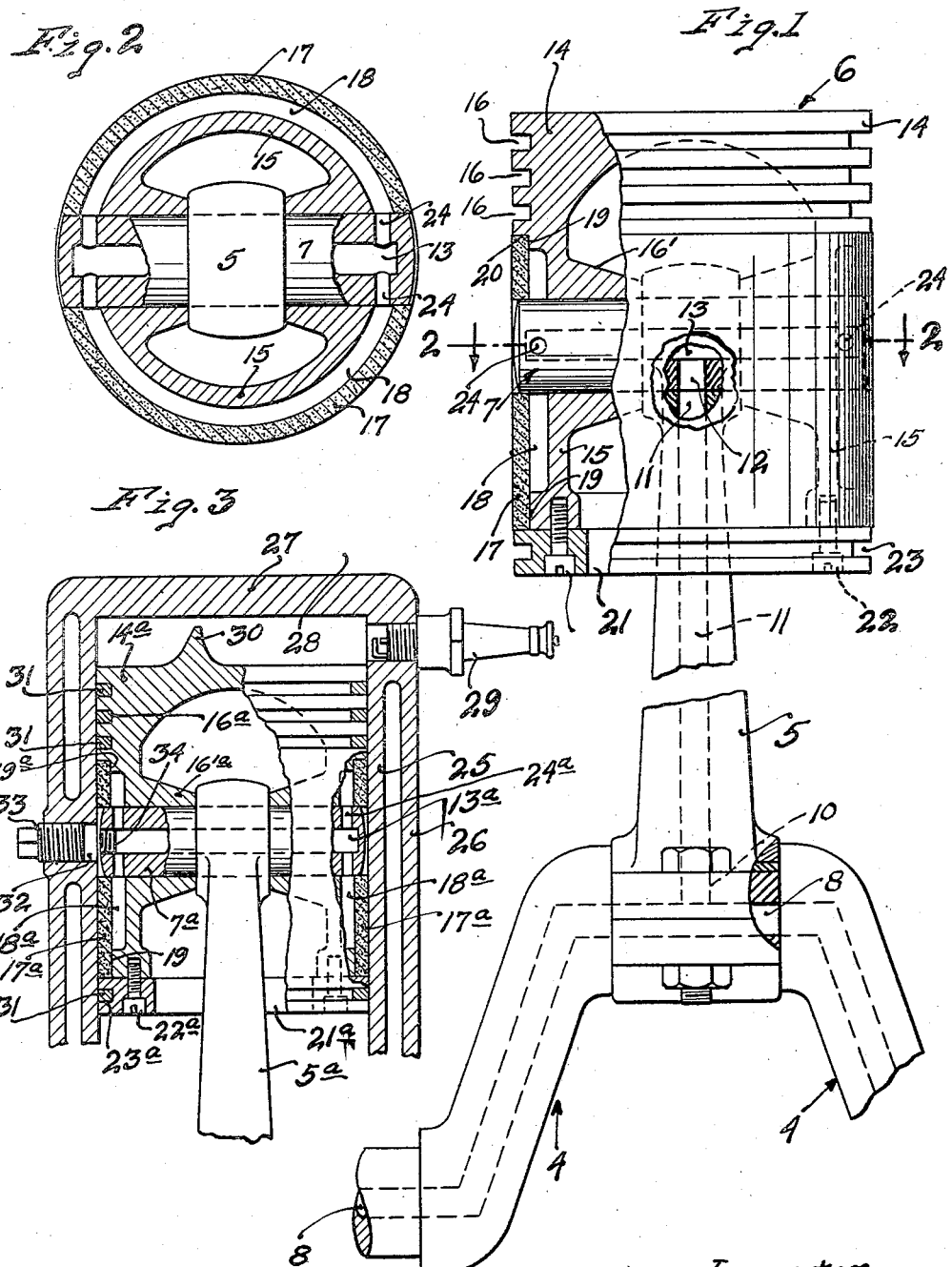

2,409,057

UNITED STATES PATENT OFFICE 2,409,057

PISTON

Arthur E. Meinke, Minneapolis, Minn.

Application May 24, 1943, Serial No. 488,113

13 Claims. (Cl. 309—6)

My present invention belongs to the piston art and relates to a self-lubricating piston for use in connection with various types of internal combustion engines, compressors, pumps, and analogous devices; an important object of the invention being the provision of an improved piston of the general character noted which is self-lubricating to the extent that it is capable of operating in a cylinder for long periods of time without receiving a supply of lubricant from any outside source.

As is well known, pistons of engines, compressors, pumps, and other analogous devices have always presented a difficult lubricating problem and often fail prematurely or become inefficient prematurely for lack of proper lubrication, and even in engines where satisfactory lubrication is provided for during normal operation the pistons often become starved of lubricant during periods of idleness and is not restored immediately upon starting the engine. It is an object of my present invention, therefore, to provide a piston having bearing portions of porous bearing material of great oil-absorbing capacity and which are detachably applied to the main piston body in such a manner as to be readily removed and replaced.

Another object of the invention is the provision of a self-lubricating piston of the composite type comprising a main piston body having bearing portions of great but fine porosity and a lubricant-containing chamber formed in the piston back of the porous bearing portions thereof, whereby the porous bearing material will be maintained saturated with lubricant.

The above and other highly important objects and advantages of the invention will be made apparent from the following specification, claims, and appended drawing.

In the accompanying drawing, like characters indicate like parts throughout the several views.

Referring to the drawing:

Fig. 1 is a view in side elevation, with some parts broken away and some parts shown in section, of an engine piston embodying the invention and connected to certain associated engine parts;

Fig. 2 is a transverse sectional view taken on the horizontal line 2—2 of Fig. 1, some parts on the section line being shown in full and some parts being broken away; and Fig. 3 is a view in axial section with some parts shown in full and some parts broken away, showing a somewhat modified engine and piston lubricating system involving the invention.

Referring first to Figs. 1 and 2, a conventional engine crank shaft is indicated by 4, a conventional engine connecting rod by 5, a piston embodying the invention by 6, and the wrist pin between the connecting rod and piston by 7. The crank shaft 4 is shown as being of the drilled or hollow type providing an oil passage 8, that runs the length of the crank shaft 4, and supplies lubricant to the connecting rod bearing or bearings 9 thereof, through connecting radial oil passage or passages 10. Also, in accordance with more or less conventional internal combustion engine practice, the connecting rod 5 is shown as being drilled or hollow to provide a longitudinal oil passage 11 communicating at one end with the radial passage 10 of the crank shaft, and at its other end with the bearing surfaces between the upper end of the connecting rod 5 and wrist pin and a radial oil passage 12 in the wrist pin. In accordance with the present invention, the wrist pin 7 is hollow or axially drilled to provide an axial oil passage 13 in communication with the radial passage 12 of the wrist pin and the ends of the wrist pin 7 are preferably closed.

The piston 6 is shown as being a composite structure comprising a main body having integrally-formed head and skirt portions 14 and 15 respectively. This piston body is hollow and is internally formed with opposed bearing bosses 16' in which the opposite end portions of the wrist pin 7 are journalled and between which the head of the connecting rod 5 is disposed. Head 14 of the main body of the piston is formed in its outer periphery with a plurality of ring-receiving grooves 16. Below its head portion 14, the main body of the piston skirt is radially reduced in size with respect to the outer periphery of the head portion 14 to receive a cylindrical bearing sleeve 17 and to provide back of the bearing sleeve an annular lubricant reservoir 18. By reference to Fig. 1 particularly, it will be seen that the annular lubricant reservoir 18 is of somewhat less length than the annular bearing sleeve 17 so as to leave annular seats 19 on the piston skirt for engagement with opposite end portions of the inner surface of bearing sleeve 17. The bearing sleeve 17 seats at its upper end against a shoulder 20 and terminates with its lower edge adjacent the lower edge of the skirt 15 where it is engaged by an annular retaining plate 21 that is detachably applied to the end of the piston skirt 15 by screws or the like 22. This annular retaining plate 21 is preferably provided in its outer periphery with a ring-receiving groove 23.

The porous bearing sleeve 17 is, as will be seen by reference particularly to Fig. 1, of slightly greater diameter than the head portion 14 of the piston or the retaining plate 21, but this difference in diameter need not be great and may be not over say 2/1000 of an inch. Preferably and as shown, the bearing sleeve 17 is drilled to receive the ends of the wrist pin 7 and preferably engages the cylindrical end portions of the wrist pin with sufficient frictional pressure to provide an effective oil seal. Now, by further reference to Figs. 1 and 2, it will be seen that the opposite end portions of the wrist pin 7 are radially or diametrically drilled to provide oil passages 24 between the axial oil passage 13 and the annular piston oil chamber 18.

The bearing sleeve 17 is preferably of porous bronze or other high grade bearing metal having great oil-absorbing capacity, and I have found that highly satisfactory results can be obtained by using for this purpose a commercially available metal known as "Oilite," which is available through the Chrysler Corporation of Detroit, Michigan. The main body of the piston comprising the head 14 and skirt 15 may be assumed to be of any conventional piston material such as iron, steel, or aluminum alloy.

In the arrangement of Figs. 1 and 2, the crank shaft oil passage 18 may be assumed to be constantly supplied with lubricating oil from the engine's pump in accordance with conventional engine practice, which usually implies introducing oil to the longitudinal crank shaft passage 8 through one or more of the crank shaft's main bearings, not shown. Oil under pressure from the passage 8 is introduced to the connecting rod bearings 9 through the radial passage or passages 10, which also connect with and introduce oil to the connecting rod oil passage 11, which, in turn, delivers oil to the bearing between the connecting rod 5 and wrist pin 7 and through the wrist pin oil passage 12 to the wrist pin oil passage 13. The oil delivered under pressure to the wrist pin oil passage 13 passes out through the radial oil passages 24 of the wrist pin and into the oil reservoir or chamber 18 of the piston, the outer wall of which is defined by the annular bearing sleeve 17. Under this constant source of supply, the chamber or reservoir 18 will be maintained full of lubricant during engine operating periods and the lubricant will be absorbed by the porous bearing sleeve 17 and delivered to the cylinder wall, not shown, at a restricted but sufficient rate to maintain the cylinder wall well lubricated, the rate being relatively high when the cylinder wall is relatively dry and being relatively very low when the cylinder wall is relatively wet with lubricant. Of course, the conventional piston compression and oil-controlling rings will be applied in the ring grooves 16; and, preferably, I apply a suitable oil-controlling ring in the groove 23 so as to control the rate of oil return from the piston walls back to the crank case.

With this structure, the piston and cylinder are not only maintained well lubricated during all engine operating conditions, but are maintained lubricated and ready for efficient operation after prolonged periods of idleness, since the supply of oil in the piston oil reservoir 18 will keep the bearing sleeve saturated like a blotter at all times and ready to give up its lubricant as needed.

*Description of Fig. 3*

While the scheme described in connection with Figs. 1 and 2 is particularly applicable to engines of the four cycle variety, or pumps and engines of more or less analogous construction, the piston described therein is also highly desirable, by proper adaptation, for use in connection with internal combustion engines of the two cycle variety, wherein the charge is admitted to the combustion chamber or chambers through the crank case of the engine. In engines of the two cycle variety, lubrication of the engine piston or pistons and cylinder or cylinders has presented a serious problem and is most usually accomplished by mixing lubricating oil with the fuel admitted into the crank case. This practice is objectionable because the highly diluted lubricants do not afford the best possible lubrication, and is further objectionable because the lubricating oil is constantly being passed up in the combustion chambers and wasted. In Fig. 3, therefore, I show an adaptation of my present invention to a two cycle variety of engine whereby the piston and cylinder of a two cycle engine may be efficiently lubricated at all times without relying upon or requiring the use of lubricants added to the fuel charge.

In Fig. 3, parts of the piston corresponding to parts of Figs. 1 and 2 are indicated by like characters plus the exponent *a*. With particular reference to Fig. 3, the cylinder of a two cycle engine is indicated by 25, the water jacket surrounding the cylinder by 26, the cylinder head by 27, the combustion chamber formed in the upper end of the cylinder by 28, and the engine's spark plug by 29; and, in accordance with conventional practice in this two cycle variety engine, the piston head 14a is provided with an upstanding portion 30 and the ring grooves 16a and 23a are provided with piston rings 31. In this form of the invention, the wrist pin 7a has no passage corresponding to the passage 12 of Figs. 1 and 2, and the connecting rod 5a may be assumed to have no passage therethrough corresponding to the passage 11 of Figs. 1 and 2, although this passage may be provided for if desired to accomplish lubrication of the bearing between the connecting rod and wrist pin; or, of course, lubrication of this bearing may be accomplished by adding a small amount of lubricant to the injected fuel.

As a means for supplying the piston lubricant reservoir 18a with suitable lubricating oil, I provide in the cylinder wall of Fig. 3 an oil hole 32 that is normally closed by a plug 33. The lubricating hole 32 is so located in the cylinder wall that the axial oil passage 13a of the wrist pin 7a will come into alignment therewith at the top of the piston stroke, and that end of the wrist pin passage 13a is primarily open but is normally closed by a plug in the nature of an Allen screw.

In this form of the invention, the piston lubricant reservoir 18a will be periodically supplied with oil by removing plugs 33 and 34 and injecting oil into the axial wrist pin passage 13a, from which the oil will flow through the passages 24a into the reservoir 18a, by means of a suitable spout-equipped oil can or the like, after which the plugs 33 and 34 are re-applied, making the engine ready for another operating period.

Of course, in the form of the invention shown in Fig. 3, piston lubrication will be effected just as in Figs. 1 and 2, so long as there is a satisfactory amount of lubricant in the reservoir 18a, which should be supplied with oil at relatively frequent intervals. It should be understood, however, that the bearing sleeve 17a will be so well saturated with oil that it will give the same up slowly but surely, even for a considerable period after lubricant has actually been exhausted from the reservoir 18a, thereby resulting in lubrication for prolonged periods even in the event of failure to service the reservoir 18a with desirable frequency.

Obviously, in the piston structures illustrated, the piston skirt of the finished product is formed by spaced inner and outer walls providing the oil reservoir between them; the bearing sleeve being the outer of said piston skirt-forming walls. The scheme of Figs. 1 and 2 may be used in connection with multi-cylinder engines without danger of upsetting the balance of the pistons, since all the piston lubricant reservoirs will be maintained full of lubricant under all conditions of operation.

What I claim is:

1. In an engine, a piston having a head portion and a skirt portion, the skirt portion being formed by spaced inner and outer walls providing a substantially annular lubricant chamber therebetween, the cylinder-engaging outer wall of the piston skirt being formed of a porous oil-absorbing bearing material, a source of lubricant, and means including a lubricant passage supplying lubricant from said source to said chamber.

2. In an engine, a cylinder, a piston working in said cylinder and having a head and a skirt, the skirt being formed by spaced inner and outer walls providing a lubricant reservoir therebetween, the outer cylinder-engaging portion of said walls being formed of a porous oil-absorbing metal, and means for introducing lubricant to the piston reservoir including cooperating oil passages leading from the lubricating reservoir of the piston.

3. A composite self-lubricating piston comprising a main body with head and skirt portions, ring receiving grooves in the periphery of the head portion of the main body, a cylindrical bearing sleeve telescoped over the skirt portion of the main body, the skirt portion of the main body being diametrically reduced intermediate the ends of the bearing sleeve to provide therebetween and the bearing sleeve a substantially annular lubricant reservoir, and said bearing sleeve being formed of a porous lubricant-absorbing material, whereby lubricant deposited in the reservoir will gradually seep through the bearing sleeve and lubricate the cylinder wall, and an oil passage for introducing lubricant to said chamber.

4. In an engine, a piston having a head portion and a skirt portion, the skirt portion being formed by spaced inner and outer walls providing a substantially annular lubricant chamber therebetween, the cylinder-engaging outer wall of the piston skirt being formed of a porous oil-absorbing bearing material, and an engine crank shaft and connecting rod connected to the crank shaft at one end and to the piston at its other end, connection between the connecting rod and piston being through a wrist pin journalled in the piston and having its end portions extended into said lubricant chamber, the crank shaft, connecting rod and wrist pin being formed with connecting oil passages, and said wrist pin being formed with an oil passage leading into the oil reservoir of the piston skirt.

5. In an engine, a piston having a head portion and a skirt portion, the skirt portion being formed by spaced inner and outer walls providing a substantially annular lubricant chamber therebetween, the cylinder-engaging outer wall of the piston skirt being formed of a porous oil-absorbing bearing material, and passages for introducing oil into the lubricant reservoir of the piston.

6. In an engine, a piston having a head portion and a skirt portion, the skirt portion being formed by spaced inner and outer walls providing a substantially annular lubricant chamber therebetween, the cylinder-engaging outer wall of the piston skirt being formed of a porous oil-absorbing bearing material, a wrist pin carried by the piston and extending transversely of the axis thereof, at least one end of said wrist pin being exposed to the lubricant reservoir of the piston, an oil passage leading into the wrist pin and a connected oil passage leading from the interior of the wrist pin to the lubricant reservoir of the piston.

7. In an engine, a cylinder, a piston working in said cylinder and having a head and a skirt, the skirt being formed by spaced inner and outer walls providing a lubricant reservoir therebetween, the outer cylinder-engaging portion of said walls being formed of a porous oil-absorbing metal, and cooperating oil passages leading from the lubricating reservoir of the piston, one of said oil passages being through the wall of the cylinder and another thereof being exposed to the cylinder oil passage in one position of the piston.

8. In an engine, a cylinder, a piston working in said cylinder and having a head and a skirt, the skirt being formed by spaced inner and outer walls providing a lubricant reservoir therebetween, the outer cylinder-engaging portion of said walls being formed of a porous oil-absorbing metal, cooperating oil passages leading from the lubricating reservoir of the piston, aligned wrist pin-receiving apertures extending diametrically of the piston and through opposite sides of the inner and outer walls of the skirt, a wrist pin seated in the several aligned apertures, an oil passage through the cylinder wall at a point traversed by one of the wrist pin-receiving apertures in the outer wall of the piston skirt, and a cooperating oil passage from that end of the wrist pin to the piston's lubricant reservoir, a removable plug for closing the oil passageway in the wrist pin, and a removable plug for closing the oil passageway in the wrist pin, and a removable plug for closing the oil passage in the cylinder.

9. In an engine, a cylinder, a piston working in said cylinder and having a head and a skirt, the skirt being formed by spaced inner and outer walls providing a lubricant reservoir therebetween, the outer cylinder-engaging portion of said walls being formed of a porous oil-absorbing metal, cooperating oil passages leading from the lubricating reservoir of the piston, aligned wrist pin-receiving apertures extending diametrically of the piston and through opposite sides of the inner and outer walls of the skirt, a wrist pin seated in the several aligned apertures, an oil passage through the cylinder wall at a point traversed by one of the wrist pin-receiving apertures in the outer wall of the piston skirt, and a cooperating oil passage from one end of the wrist pin to the piston's lubricant reservoir, a removable plug for closing the oil passageway in the wrist pin, and a removable plug for closing the oil passage in the cylinder, the said wrist pin plug being smaller than and removable through the oil passage of the cylinder when the plug thereof is removed.

10. A composite self-lubricating piston comprising a main body with head and skirt portions, ring receiving grooves in the periphery of the head portion of the main body, a cylindrical bearing sleeve telescoped over the skirt portion of the main body, the skirt portion of the main body being diametrically reduced intermediate the ends of the bearing sleeve to provide therebetween and the bearing sleeve a substantially annular lubricant reservoir, and said bearing sleeve being formed of a porous lubricant-absorbing material, whereby lubricant deposited in the reservoir will gradually seep through the bearing sleeve and lubricate the cylinder wall, and a centrally apertured retaining plate detachably applied to the lower edge of the piston skirt and engaging the lower edge of the bearing sleeve.

11. A composite self-lubricating piston comprising a main body with head and skirt portions, ring receiving grooves in the periphery of the head portion of the main body, a cylindrical bearing sleeve telescoped over the skirt portion of the main body, the skirt portion of the main body being diametrically reduced intermediate the ends of the bearing sleeve to provide therebetween and the bearing sleeve a substantially annular lubricant reservoir, and said bearing sleeve being formed of a porous lubricant-absorbing material, whereby lubricant deposited in the reservoir will gradually seep through the bearing sleeve and lubricate the cylinder wall, and an annular retaining plate detachably applied to the lower edge of the piston skirt and engaging the lower edge of the bearing sleeve, said plate being detachably applied to the piston skirt by threaded screws.

12. A composite self-lubricating piston comprising a main body with head and skirt portions, ring receiving grooves in the periphery of the head portion of the main body, a cylindrical bearing sleeve telescoped over the skirt portion of the main body, and said bearing sleeve being formed of a porous lubricant-absorbing material, and a centrally apertured retaining plate detachably applied to the lower edge of the piston skirt and engaging the lower edge of said bearing sleeve.

13. In an engine, a cylinder, a reciprocating piston working in said cylinder, said piston involving a head portion and a skirt portion, said skirt portion comprising a cylindrical wall with its outer surface bearing against the inner surface of the cylinder, said cylindrical wall being formed of bearing material of relatively high but very fine porosity, and means continuously supplying lubricating oil to the inner surface of said cylindrical skirt wall, whereby to lubricate the piston and cylinder by continuous absorption of lubricant through said porous piston skirt wall.

ARTHUR E. MEINKE.